(12) United States Patent
Yoon

(10) Patent No.: US 8,412,228 B2
(45) Date of Patent: Apr. 2, 2013

(54) MOBILE TERMINAL AND PHOTOGRAPHING METHOD FOR THE SAME

(75) Inventor: Young Kwon Yoon, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 367 days.

(21) Appl. No.: 12/272,133

(22) Filed: Nov. 17, 2008

(65) Prior Publication Data

US 2009/0131104 A1   May 21, 2009

(30) Foreign Application Priority Data

Nov. 21, 2007   (KR) ........................ 10-2007-0119065

(51) Int. Cl.
    *H04Q 7/20*   (2006.01)

(52) U.S. Cl. ..................................... 455/456.1; 348/272

(58) Field of Classification Search ............... 455/556.1, 455/556.2; 348/207.1, 22.1, 241, 272, 27; 396/275
See application file for complete search history.

(56) References Cited

U.S. PATENT DOCUMENTS

| | | | |
|---|---|---|---|
| 7,321,783 B2* | 1/2008 | Kim ........................... | 455/556.1 |
| 2005/0057670 A1* | 3/2005 | Tull et al. ....................... | 348/241 |
| 2006/0092407 A1* | 5/2006 | Tan et al. ....................... | 356/221 |
| 2007/0146512 A1* | 6/2007 | Suzuki et al. .................. | 348/272 |
| 2007/0189759 A1* | 8/2007 | Kobayashi et al. ............ | 396/275 |

* cited by examiner

*Primary Examiner* — Patrick Edouard
*Assistant Examiner* — Myron Wyche
(74) *Attorney, Agent, or Firm* — Cha & Reiter, LLC

(57) ABSTRACT

A mobile terminal and photographing method for the same are disclosed. The mobile terminal includes an optical section receiving optical signals, an image sensor comprising color sensor elements detecting sensing-image information from a transmitted optical signal, and infrared sensor elements detecting infrared-image information from the transmitted optical signal and an image processing unit producing infrared-image information of the color sensor elements, using the detected infrared-image information.

10 Claims, 5 Drawing Sheets

MOBILE TERMINAL AND PHOTOGRAPHING METHOD FOR THE SAME

CLAIM OF PRIORITY

This application claims the benefit of the earlier filing date, pursuant to 35 USC 119, that that patent an application entitled "MOBILE TERMINAL AND PHOTOGRAPHING METHOD FOR THE SAME" filed in the Korean Intellectual Property Office on Nov. 21, 2007 and assigned Serial No. 2007-0119065, the contents of which are incorporated herein by reference.

BACKGROUND OF THE INVENTION

1. Field of the Invention

The present invention relates to a mobile terminal with a camera and, more particularly, to a camera-equipped mobile terminal and photographing method for enabling low illuminance image capture.

2. Description of the Related Art

Modern mobile terminals have various supplementary functions related to, for example, cameras, digital multimedia broadcasting, and Bluetooth communication. These mobile terminals have various multimedia-related functions, and have become composite terminals. In particular, the user of a camera-equipped mobile terminal can capture desired images. Employment of an infrared cut-off filter enables the mobile terminal to capture clear color images in normal lighting conditions.

However, it is not easy for the mobile terminal to capture acceptable images in low illuminance or lighting conditions. However, without the infrared cut-off filter, the mobile terminal could capture sharp images in low illuminance conditions, but may have difficulty in capturing clear color images in normal illuminance conditions. That is, it is difficult for a camera-based mobile terminal to capture acceptable images in both low and normal illuminance conditions.

SUMMARY OF THE INVENTION

The present invention provides a camera-equipped mobile terminal and photographing method for the same that can easily capture sharp images in both low and normal illuminance conditions.

In accordance with an exemplary embodiment of the present invention, there is provided a mobile terminal including an optical section receiving optical signals, an image sensor comprising color sensor elements detecting sensing-image information from a transmitted optical signal, and infrared sensor elements detecting infrared-image information from the transmitted optical signal, and an image processing unit producing infrared-image information of the color sensor elements, using the detected infrared-image information.

In accordance with another exemplary embodiment of the present invention, there is provided a photographing method for a mobile terminal, including receiving, in response to a image capture request, optical signals, detecting sensing-image information from a transmitted optical signal through color sensor elements, and detecting infrared-image information from the transmitted optical signal through infrared sensor elements and producing infrared-image information of the color sensor elements, using the detected infrared-image information.

In one aspect of the present invention, there is no infrared cut-off filter in front of the image sensor of the mobile terminal. Infrared-image information obtained by the image sensor enables capturing sharp images in low illuminance conditions and in normal illuminance conditions.

BRIEF DESCRIPTION OF THE DRAWINGS

The features and advantages of the present invention will be more apparent from the following detailed description in conjunction with the accompanying drawings, in which.

DETAILED DESCRIPTION OF THE INVENTION

Exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention.

In the description, the term "optical signal" refers to a signal that can be processed by the mobile terminal in relation to photography. An optical signal includes color-image information and infrared-image information. The color-image information includes at least red-, blue- and green-image information. Although the present invention is described with regard to red, blue and green, it would be recognized by those skilled in the art that other colors may also be considered, have been contemplated and are within the scope of the invention. The term "sensing-image information" refers to information that can be detected from optical signals received by the mobile terminal. Sensing-image information includes color-image information and infrared-image information. The color-image information is one of red-image information, blue-image information, and green-image information or other well-known color combinations. The term "illuminance" refers to the amount of light falling on a particular surface per unit area. The term "low illuminance" refers to an illuminance that is lower than or equal to (i.e., no greater than) a preset illuminance level. The term "normal illuminance" refers to an illuminance that is higher than the preset illuminance level.

Figure 1:
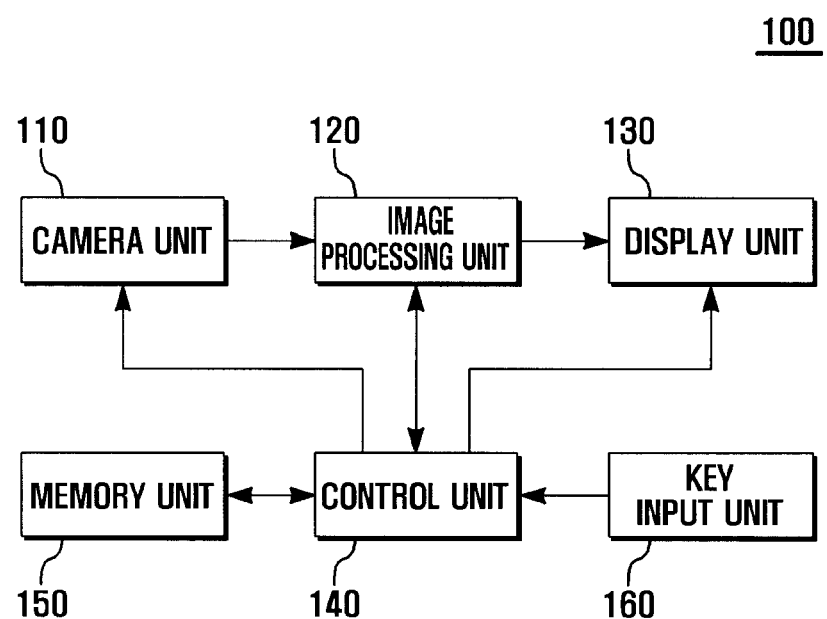
FIG. 1 is a block diagram illustrating a mobile terminal according to an exemplary embodiment of the present invention.
Figure 2:
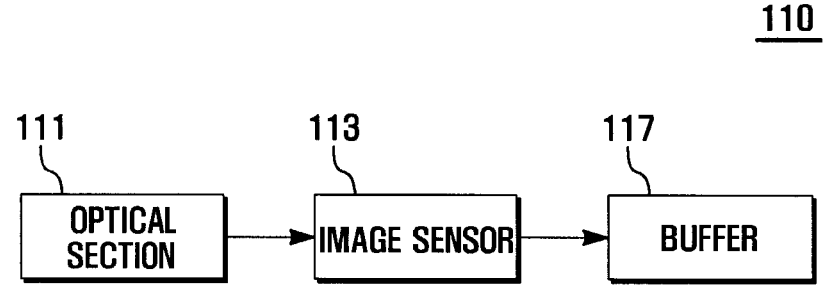
FIG. 2 is a block diagram of a camera unit in the mobile terminal of FIG. 1.
Figure 3A:
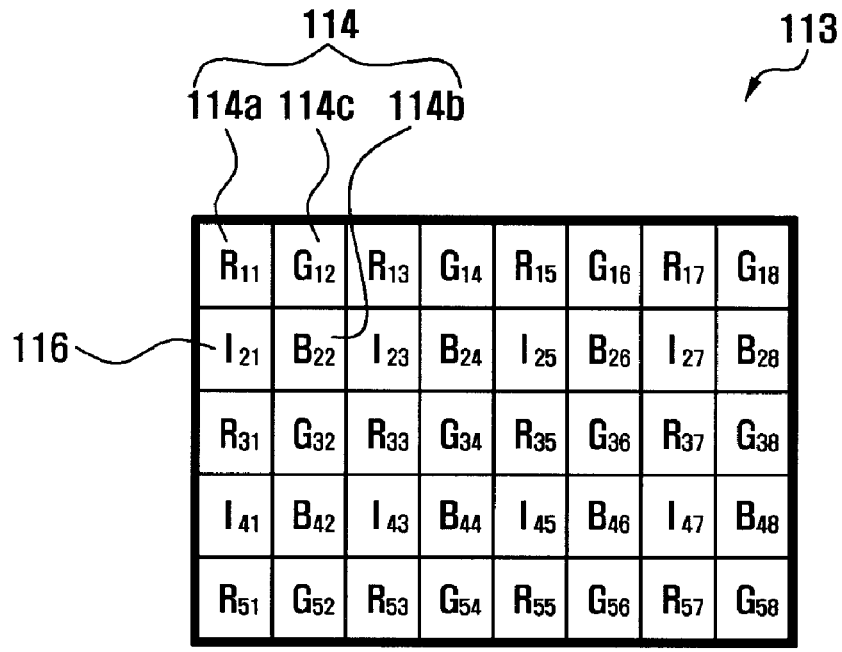
FIGS. 3A and 3B illustrate structures of an image sensor in the camera unit of FIG. 2.
Figure 3B:
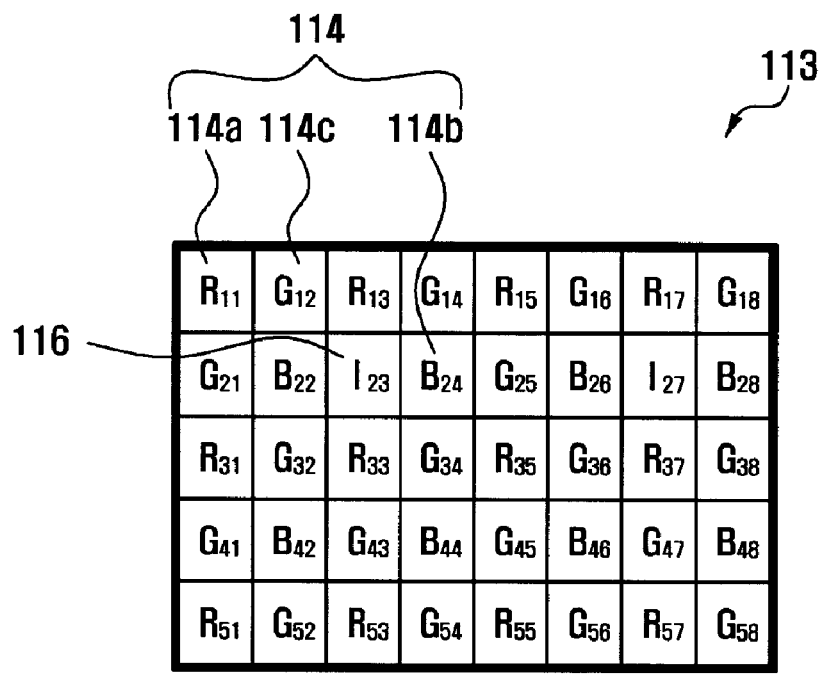

FIG. 1 is a block diagram illustrating a mobile terminal according to an exemplary embodiment of the present invention. FIG. 2 is a block diagram of a camera unit in the mobile terminal. FIGS. 3A and 3B illustrate structures of an image sensor in the camera unit. In exemplary embodiments of the invention, one infrared sensor element is allocated per each group of 2×2 pixels in FIG. 3A, and one infrared sensor element is allocated per each group of 4×4 pixels in FIG. 3B.

Referring to FIG. 1, the mobile terminal 100 includes a camera unit 110, image processing unit 120, display unit 130, control unit 140, memory unit 150, and key input unit 160.

The camera unit 110 produces image data corresponding to captured images. As shown in FIG. 2, the camera unit 110 includes an optical section 111, image sensor 113, and buffer 117.

The optical section 111 receives an optical signal. The optical signal includes color-image information and infrared-image information. The optical section 111 includes a lens and lens regulator (not shown).

The image sensor 113 converts an optical signal corresponding to a formed image into an electrical signal, and further converts the analog electrical signal into digital data. The image sensor 113 may be a charge-coupled device (CCD) sensor or a complementary metal-oxide-semiconductor (CMOS) sensor. In particular, the image sensor 113 includes color sensor elements 114 and infrared sensor elements 116 (FIGS. 3A, 3B). The color sensor elements 114 include a red sensor element 114a, blue sensor element 114b, and green sensor element 114c (or other similar sensor elements associated with other colors). The color sensor elements 114 detect sensing-image information including color-image information and infrared-image information from a transmitted optical signal. That is, the red sensor element 114a detects sensing-image information including red-image information, the blue sensor element 114b detects sensing-image information including blue-image information, and the green sensor element 114c detects sensing-image information including green-image information. The infrared sensor elements 116 detect infrared-image information from a transmitted optical signal.

As shown in FIG. 3A or 3B, within the image sensor 113, red sensor elements 114a, blue sensor elements 114b, green sensor elements 114c, and infrared sensor elements 116 are arranged to form a grid. That is, the image sensor 113 has a grid structure of multiple cells. As shown in FIG. 3A, each cell of the grid may be composed of a red sensor element 114a, blue sensor element 114b, green sensor element 114c and infrared sensor elements 116. As shown in FIG. 3B, each cell of the grid may be composed of four red sensor elements 114a, four blue sensor elements 114b, seven green sensor elements 114c and one infrared sensor element 116.

The buffer 117 (FIG. 2) stores sensing-image information and infrared-image information detected by the image sensor 113. That is, the buffer 117 stores sensing-image information corresponding to positions of the individual color sensor elements 114, and stores infrared-image information corresponding to positions of the individual infrared sensor elements 116.

Returning to FIG. 1, the image processing unit 120 generates screen data to display image data from the camera unit 110. The image processing unit 120 processes image data from the camera unit 110 on a frame-by-frame basis, and outputs frame image data corresponding to display characteristics and the size of the display unit 130. The image processing unit 120 includes a video coder/decoder (codec) to compress frame image data to be displayed on the display unit 130 in a preset format and to decompress compressed frame image data into frame image data. The video codec may be a Joint Photographic Experts Group (JPEG) codec, Moving Picture Experts Group-4 (MPEG-4) codec or wavelet codec.

In particular, the image processing unit 120 produces infrared-image information of the color sensor elements 114, using infrared-image information of the infrared sensor elements 116. In a low illuminance mode, the image processing unit 120 restores infrared-image information of the color sensor elements 114 and infrared sensor elements 116. In a normal illuminance mode, the image processing unit 120 produces color-image information of the color sensor elements 114 by excluding infrared-image information of the color sensor elements 114 from sensing-image information. The image processing unit 120 produces color-image information of the infrared sensor elements 116, using color-image information of the color sensor elements 114. The image processing unit 120 restores color-image information of the color sensor elements 114 and infrared sensor elements 116.

The display unit 130 displays an image signal from the image processing unit 120, and user data from the control unit 140. The display unit 130 may include a panel of light emitting devices (LEDs), liquid crystal display (LCD) devices, LCD controller, and memory device for storing image data. If the panel has a touch screen capability, the display unit 130 can also act as an input device.

The control unit 140 controls the overall operation of the mobile terminal 100. In particular, the control unit 140 controls selection of one of a normal illuminance mode and a low illuminance mode in response to an image capture command. For example, in response to an image capture command, the control unit 140 can measure the illuminance on the basis of received optical signals. If the measured illuminance is lower than or equal to a preset level, the control unit 140 initiates the low illuminance mode for photographing. If the measured illuminance is higher than the preset level, the control unit 140 initiates the normal illuminance mode. Alternatively, in response to an image capture command, the control unit 140 can compare the current time with a preset reference time. Then, the control unit 140 can select one of the normal illuminance mode and low illuminance mode appropriate to the current time. Alternatively, the control unit 140 can select one of the normal illuminance mode and low illuminance mode according to a user request.

The memory unit 150 includes a program storage section and data storage section. The program storage section stores a program to photograph a picture in the low illuminance mode and in the normal illuminance mode. The data storage section stores data generated from execution of the program. The memory unit 150 can further store a reference illuminance value and reference time value, which are utilized to select one of the low illuminance mode and the normal illuminance mode in response to an image capture command.

The key input unit 160 includes keys to set and execute various functions. The key input unit 160 includes a key to generate an image capture command, and may further include a key to select one of the low illuminance mode and the normal illuminance mode for photographing.

Figure 4:
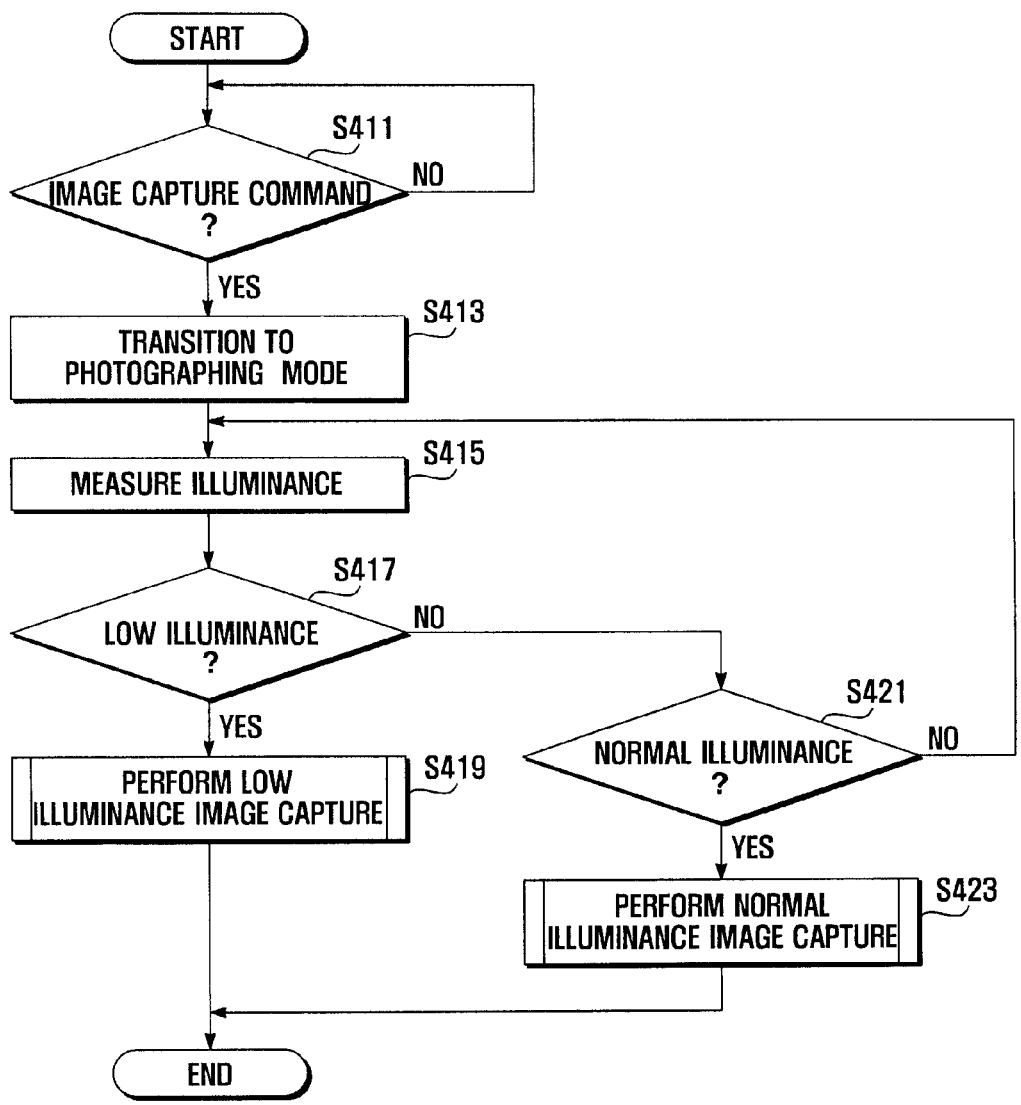
FIG. 4 is a flow chart illustrating a photographing method according to another exemplary embodiment of the present invention.

FIG. 4 is a flow chart illustrating a photographing method according to another exemplary embodiment of the present invention.

Referring to FIG. 4, the control unit 140 of the mobile terminal 100 checks whether an image capture command is issued (S411). When and image capture command is issued, the control unit 140 transitions to the photographing mode (S413). That is, the control unit 140 activates the camera unit 110. The control unit 140 measures the illuminance on the basis of optical signals received through the camera unit 110 (S415) and determines whether the measured illuminance corresponds to a low illuminance level (S417). That is, the control unit 140 determines whether the measured illuminance is lower than or equal to the preset reference value.

If the measured illuminance corresponds to a low illuminance level, the control unit 140 controls execution of low illuminance image capture (S419). Low illuminance shooting is described in detail in connection with FIG. 5.

Figure 5:
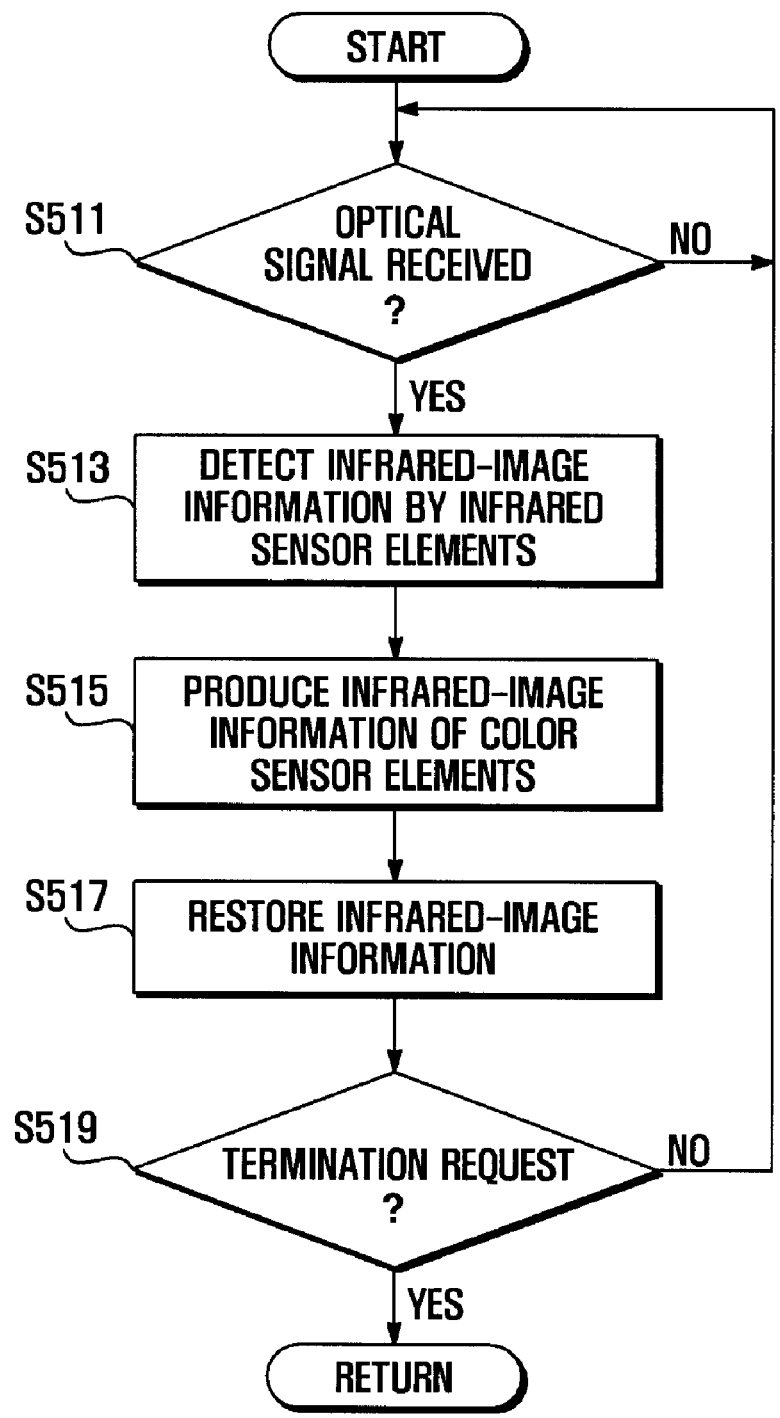
FIG. 5 is a flow chart illustrating a procedure of low illuminance image capture in the method of FIG. 4.

FIG. 5 is a flow chart illustrating a procedure of low illuminance image capture in the method of FIG. 4.

Referring to FIG. 5, when the infrared sensor elements 116 of the image sensor 113 receive an optical signal through the optical section 111 in the low illuminance mode (S511), the infrared sensor elements 116 detect infrared-image information from the optical signal (S513). At this step, the color sensor elements 114 of the image sensor 113 detect sensing-image information from the optical signal (not shown). Although not shown, the buffer 117 can store the infrared-image information corresponding to the individual infrared sensor elements 116, and store the sensing-image information corresponding to the individual color sensor elements 114.

The image processing unit 120 produces infrared-image information of the color sensor elements 114, using the infrared-image information of the infrared sensor elements 116 (S515). For example, when the image sensor 113 has the configuration in FIG. 3A or 3B, the image processing unit 120 produces infrared-image information of an infrared sensor element 116 in a single cell as infrared-image information of color sensor elements 114 in the cell. That is, the image processing unit 120 can regard that each of the color sensor elements 114 and the infrared sensor element 116 in a single cell posses infrared-image information. Although not shown, when the image sensor 113 includes at least two infrared sensor elements 116 in a single cell, the image processing unit 120 can produce interpolated infrared-image information of the infrared sensor elements 116 with infrared-image information of color sensor elements 114 in the same cell.

Thereafter, the image processing unit 120 restores infrared-image information of the color sensor elements 114 and infrared sensor elements 116 (S517). That is, the image processing unit 120 generates displayable screen data from the infrared-image information.

The control unit 140 checks whether a termination request for the low illuminance mode is issued (S519). If a termination request is issued, the control unit 140 controls the camera unit 110 to terminate the low illuminance mode. If a termination request is not issued, the control unit 140 returns to step S511 to continue the low illuminance mode.

Referring back to FIG. 4, if the measured illuminance does not correspond to the low illuminance level, the control unit 140 checks whether the measured illuminance corresponds to a normal illuminance level (S421). That is, the control unit 140 determines whether the measured illuminance is higher than the preset reference value. If the measured illuminance corresponds to a normal illuminance level, the control unit 140 controls execution of normal illuminance image capture (S423). Normal illuminance image capture is described in detail in connection with FIG. 6.

Figure 6:
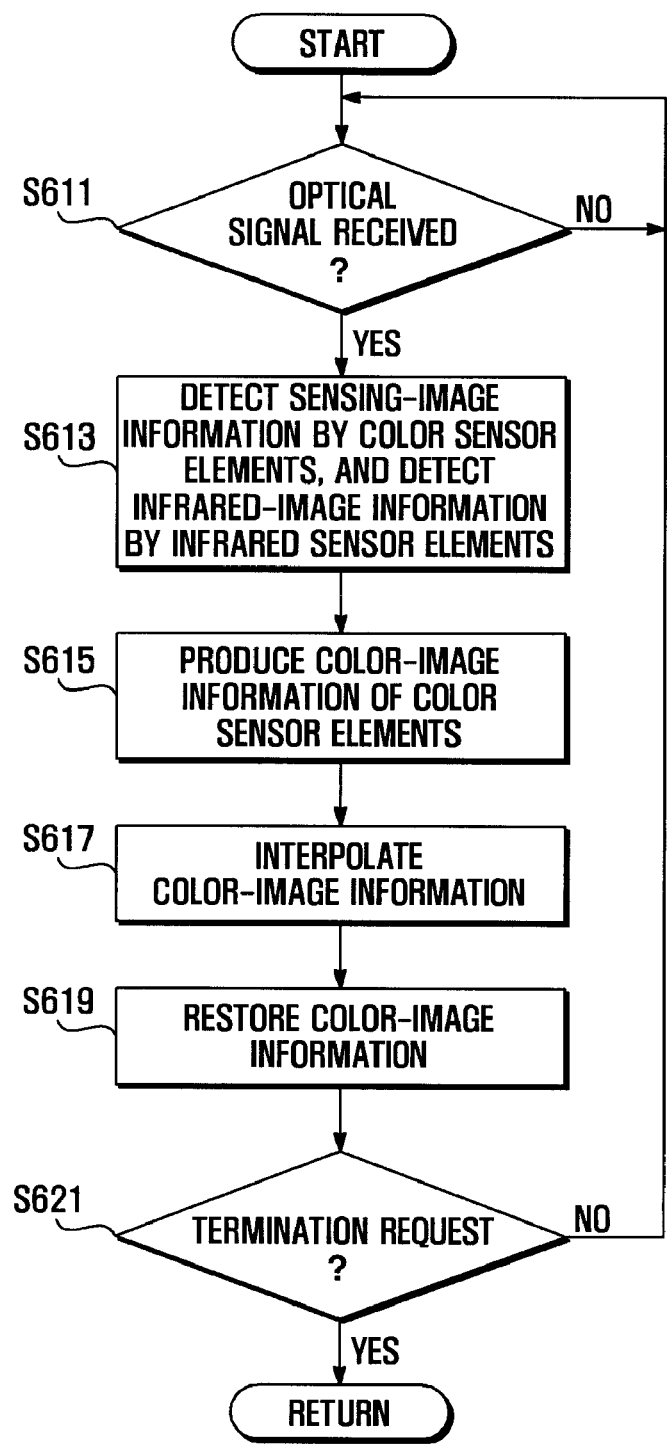
FIG. 6 is a flow chart illustrating a procedure of normal illuminance image capture in the method of FIG. 4.

FIG. 6 is a flow chart illustrating a procedure of normal illuminance shooting in the method of FIG. 4.

Referring to FIG. 6, when an optical signal is received through the optical section 111 in the normal illuminance mode (S611), the color sensor elements 114 and infrared sensor elements 116 of the image sensor 113 detect sensing-image information and infrared-image information, respectively, from the optical signal (S613). That is, the color sensor elements 114 of the image sensor 113 detect sensing-image information from the optical signal, and the infrared sensor elements 116 detect infrared-image information from the optical signal. Although not shown, the buffer 117 can store the sensing-image information in correspondence with the individual color sensor elements 114, and store the infrared-image information in correspondence with the individual infrared sensor elements 116.

The image processing unit 120 produces color-image information of the color sensor elements 114, using the infrared-image information of the infrared sensor elements 116 (S615). That is, the image processing unit 120 produces color-image information of the color sensor elements 114 by excluding the infrared-image information of the infrared sensor elements 116 from the sensing-image information of the color sensor elements 114. For example, when the image sensor 113 has the configuration in FIG. 3A or 3B, the image processing unit 120 can produce color-image information of the color sensor elements 114 in a cell by excluding infrared-image information of the infrared sensor element 116 in the cell from the sensing-image information of the color sensor elements 114 in the cell. That is, the image processing unit 120 can regard the color sensor elements 114 and the infrared sensor element 116 in a single cell as having the same infrared-image information. Although not shown, when the image sensor 113 includes at least two infrared sensor elements 116 in a single cell, the image processing unit 120 may produce color-image information of the color sensor elements 114 in a cell by excluding interpolated infrared-image information of the infrared sensor elements 116 in the cell from the sensing-image information of the color sensor elements 114 in the cell. Namely, the image processing unit 120 produces red-image information from the red sensor element 114a, blue-image information from the blue sensor element 114b, and green-image information from the green sensor element 114c.

The image processing unit 120 in addition interpolates color-image information of the image sensor 113 using color-image information of the color sensor elements 114 (S617). The image processing unit 120 can interpolate color-image information on a cell basis. That is, the image processing unit 120 produces red-image information for the blue sensor element 114b, green sensor element 114c and infrared sensor element 116, using red-image information from the red sensor element 114a neighboring the blue sensor element 114b, green sensor element 114c and infrared sensor element 116. The image processing unit 120 produces blue-image information for the red sensor element 114a, green sensor element 114c and infrared sensor element 116, using blue-image information from the blue sensor element 114b neighboring the red sensor element 114a, green sensor element 114c and infrared sensor element 116. The image processing unit 120 produces green-image information for the red sensor element 114a, blue sensor element 114b and infrared sensor element 116, using the green-image information from green sensor element 114c neighboring the red sensor element 114a, blue sensor element 114b and infrared sensor element 116. The image processing unit 120 restores color-image information of the color sensor elements 114 and infrared sensor elements 116 (S619). That is, the image processing unit 120 generates displayable screen data from red-, blue- and green-image information.

The control unit 140 checks whether a termination request for the normal illuminance mode is issued (S621). If a termination request is issued, the control unit 140 controls the camera unit 110 to terminate the normal illuminance mode. If a termination request is not issued, the control unit 140 returns to step S611 to continue the normal illuminance mode.

In the description, the color sensor elements of the image sensor detect sensing-image information including both color-image information and infrared-image information. However, the present invention is not limited thereto. The present invention can also be applied to the case where the color sensor elements detect only color-image information. In this case, the image processing unit does not have to exclude infrared-image information of the infrared sensor elements from the sensing-image information of the color sensor elements. Thus, the procedure for the low illuminance mode is the same as described above. In the procedure for the normal illuminance mode, the color sensor elements detect color-image information, but the infrared sensor elements do not have to detect infrared-image information. Separate production of color-image information of the color sensor elements is not necessary. That is, it is unnecessary to separately produce red-image information from red sensor elements, blue-image information from blue sensor elements, and green-image information from green sensor elements.

As apparent from the above description, the camera-equipped mobile terminal includes color sensor elements and infrared sensor elements. Hence, the mobile terminal can capture sharp images in low illuminance conditions using infrared-image information detected by the infrared sensor elements. In addition, the mobile terminal can capture clear color images in normal illuminance conditions using color-image information detected by the color sensor elements. Accordingly, the mobile terminal can easily photograph clear images in low and normal illuminance conditions.

The above-described methods according to the present invention can be realized in hardware or software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A mobile terminal comprising:
   an optical section receiving optical signals;
   an image sensor comprising:
      color sensor elements detecting sensing-image information from a transmitted optical signal, and
      infrared sensor elements detecting infrared-image information from the transmitted optical signal, said color sensor elements and infrared sensor elements being interspersed within a matrix structure; and
   an image processing unit for:
   determining an illuminance level of the optical signals;
   detecting an infrared image from the infrared sensor elements and
   producing an infrared-image from the infrared sensor elements when the illuminance is determined to be low; and
   producing a color-image when the illuminance is determined to be normal, wherein the color image is obtained by excluding the infrared-image information of the infrared sensor elements from the sensing-image information of the color sensor elements.

2. The mobile terminal of claim 1, wherein the image processing unit produces color-image information of the infrared sensor elements, and restores color-image information of the color sensor elements and infrared sensor elements, using the produced color-image information.

3. The mobile terminal of claim 1, further comprising:
   a control unit controlling, in response to an image capture request, an operation to measure the illuminance on the basis of received optical signals, to initiate, when the measured illuminance is lower than or equal to a preset reference value, the low illuminance mode for photographing, and to initiate, when the measured illuminance is higher than the preset reference value, the normal illuminance mode for photographing.

4. The mobile terminal of claim 1, further comprising a buffer storing the detected infrared-image information in correspondence with positions of the individual infrared sensor elements, and storing the detected sensing-image information in correspondence with positions of the individual color sensor elements.

5. A photographing method for a mobile terminal, comprising:
   receiving, in response to an image capture request, optical signals;
   detecting sensing-image information of the optical signal through color sensor elements, and detecting infrared-image information of the optical signal through infrared sensor elements;
   measuring an illuminance level of the optical signals; and
   producing an infrared-image from the infrared sensor elements when the measured illuminance is low and a color-image when the measured illuminance is normal, wherein the color image is obtained by excluding the infrared-image information of the infrared sensor elements from the sensing-image information of the color sensor elements.

6. The photographing method of claim 5, further comprising:
   producing color-image information of the infrared sensor elements using the produced color-image information; and
   restoring color-image information of the color sensor elements and infrared sensor elements.

7. The photographing method of claim 5, further comprising:
   initiating, when the measured illuminance is lower than or equal to a preset reference value, the low illuminance mode for photographing, and initiating, when the measured illuminance is higher than the preset reference value, the normal illuminance mode for photographing.

8. An image processing device comprising:
   a processor in communication with a memory, the memory containing code which when accessed by the processor causes the processor to:
      receive a plurality of optical signals from corresponding ones of a plurality of sensor elements arranged in a matrix, said optical signals being in a visible light range and an infrared light range;
      determine a level of illumination of said received optical signals;
      perform one of:
         a low level illumination process when said determined level of illumination is no greater than a preset reference level, said low level illumination process comprising:
            storing optical signals associated with said infrared light range; and
            generating an image based on said stored optical signals; and a normal illumination process when said determined level illumination is greater than the preset reference level, the normal illumination process comprising:
storing optical signals associated with the infrared light range and the visible light range; and
generating an image based on the stored optical signals, wherein the signals associated with the infrared light range are excluded.

9. The device of claim 8, further comprising:
interpolating said stored visible light range signals; and
generating the image based on said interpolated stored visible light signals.

10. An image processing device comprising:
a processor in communication with a memory, the memory containing code which when accessed by the processor causes the processor to:
receive a plurality of optical signals from corresponding ones of a plurality of sensor elements arranged in a matrix, said optical signals being in a visible light range and an infrared light range;
determine a time of day;
perform a normal level illumination process when said determined time of day is greater than a preset reference level, said normal level illumination process comprising:
storing the optical signals; and
generating an image based on said stored optical signals by excluding the optical signals associated with the infrared light range; and
perform a low level illumination process when said determined time of day is less than a preset reference level, said low level illumination process comprising:
storing the optical signals in the infrared light range; and
generating an image based on said stored optical signals.

* * * * *